United States Patent [19]
Simpson

[11] Patent Number: 5,209,478
[45] Date of Patent: May 11, 1993

[54] GAME CONTROLLER BOARD HOLDER

[76] Inventor: Ronald E. Simpson, 2370 Flamingo Dr., Florissant, Mo. 63031

[21] Appl. No.: 819,833

[22] Filed: Jan. 13, 1992

[51] Int. Cl.⁵ ............................................. A63B 71/04
[52] U.S. Cl. .................. 273/148 B; 248/346; 248/316.7; 211/13
[58] Field of Search ............... 273/148 B; 248/346, 248/316.7, 146, 176; 211/13

[56] References Cited

U.S. PATENT DOCUMENTS

| | | | |
|---|---|---|---|
| 4,422,640 | 12/1983 | Tamarkin | 273/148 B X |
| 4,494,755 | 1/1985 | Caillouet, Jr. | 273/148 B |
| 4,504,509 | 3/1985 | Weinreib | 273/148 B |
| 4,573,682 | 3/1986 | Mayon | 248/176 X |

OTHER PUBLICATIONS

"Lap Chap" advertisement, manufactured by Rox Ham Corp., on sale Jan. 1984.

Primary Examiner—Theatrice Brown
Assistant Examiner—Raleigh W. Chiu
Attorney, Agent, or Firm—Senniger, Powers, Leavitt & Roedel

[57] ABSTRACT

A game controller board holder for holding a game controller board of the type having a housing and a cord extending from the housing is disclosed herein. The holder includes a platform for supporting the game controller board placed on the platform. The platform has a first surface for engaging the game controller board housing, and retainers releasably secure the housing to the platform.

13 Claims, 2 Drawing Sheets

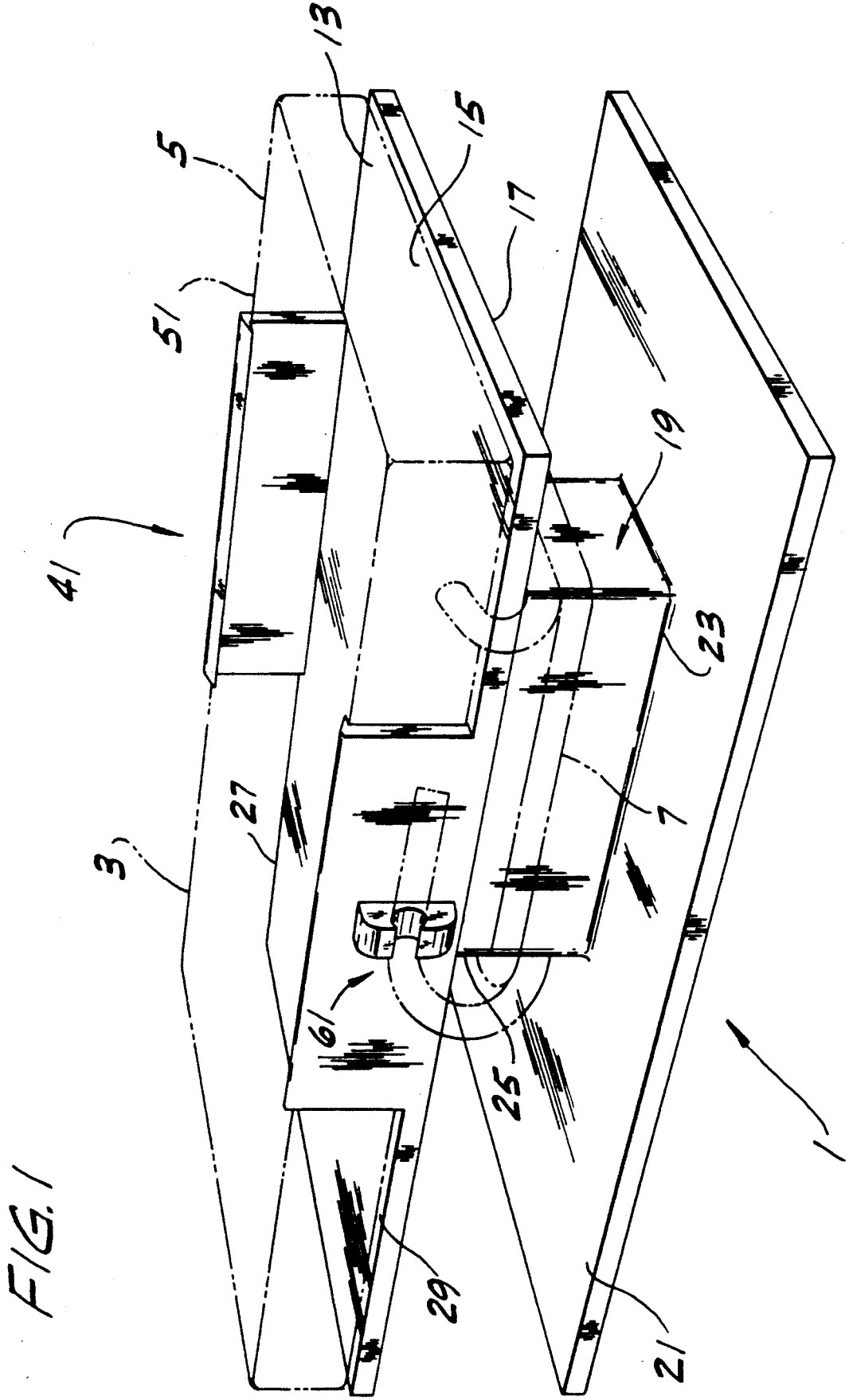

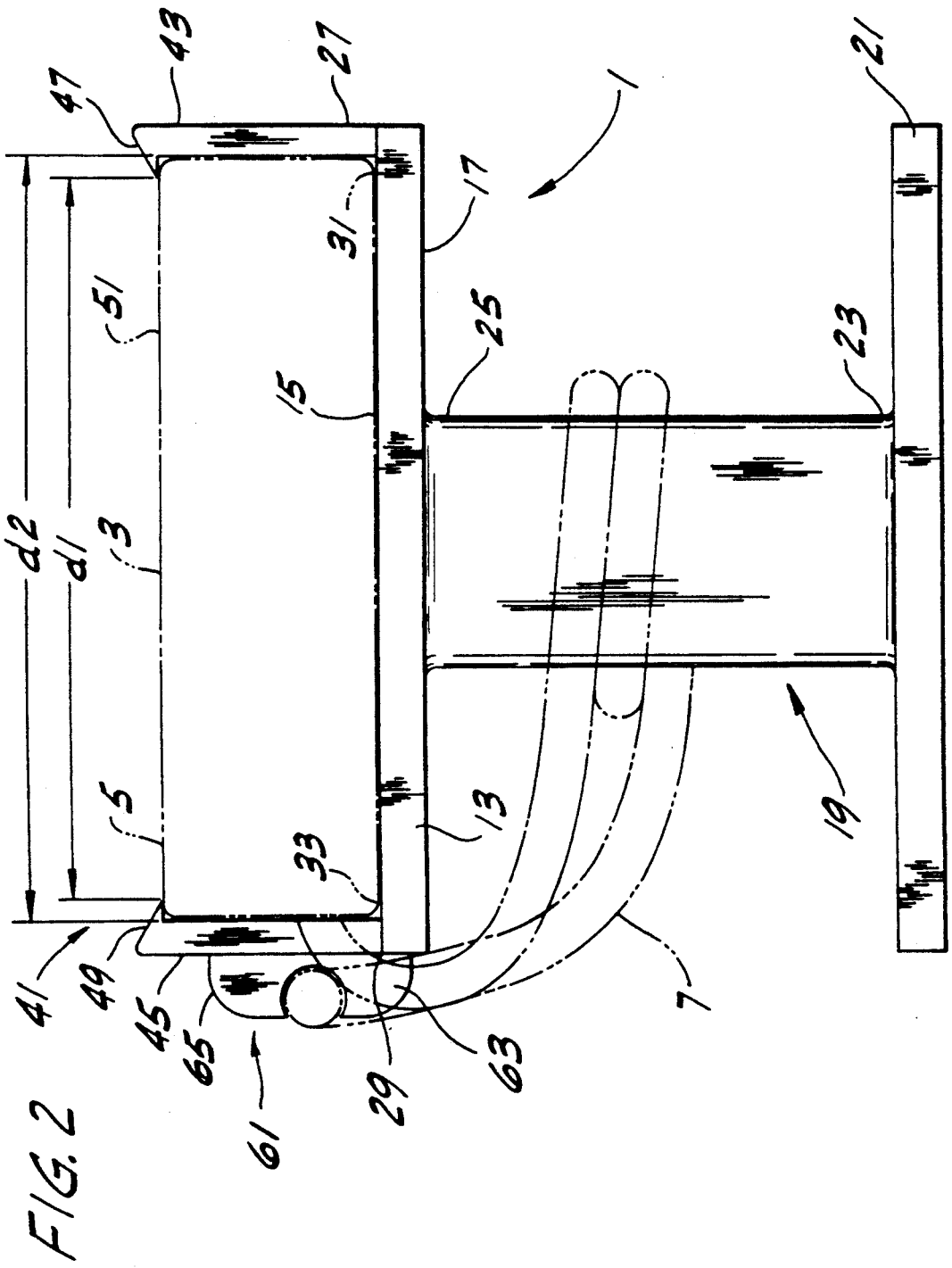

GAME CONTROLLER BOARD HOLDER

BACKGROUND OF THE INVENTION

This invention relates generally to a game controller board holder capable of holding a game controller board of the type having a housing and a cord extending from the housing.

Home video games frequently have controller boards which are electrically connected to a game monitor by one or more flexible cords. Typically, game monitors are television sets which are also used for game use. Depending on the type of game, there may also be a connection from the game controller board to the power source if the controller board requires an independent electrical connection. The controller boards are generally of the type having a housing with keys on the top surface of the housing for activating and playing a game viewed on the monitor. A joystick may also be provided on the top surface of the housing for playing games. After using or playing with the game controller board, children often leave the board and the various cords which connect the different components scattered on the floor where they are unsightly and also subject to being damaged. Even if the game controller board is put away, the presence of the cord makes it difficult to store neatly, and the internal components can still be damaged by a magnetic field associated with the electrical power cord if the cord is wrapped around the board. Accordingly, there is a need in the electronic game industry for a game controller board holder for storing a game controller board.

SUMMARY OF THE INVENTION

Among the several objects of this invention may be noted the provision of a game controller board holder which releasably holds a game controller board; the provision of such a game controller board holder which holds a connecting cord associated with the game controller board generally adjacent to the board; the provision of such a game controller board holder which releasably fixes an end of the connecting cord; and the provision of a game controller board holder which is sturdy in construction and economical to manufacture.

Generally, a game controller board holder constructed according to the principles of the present invention comprises a platform for supporting the game controller board housing placed on the platform. The platform has first and second surfaces, the first surface for engaging the game controller board housing. Means for releasably securing the housing to the platform is further provided.

Other objects and features will be in part apparent and in part pointed out hereinafter.

BRIEF DESCRIPTION OF THE DRAWINGS

FIG. 1 is a perspective of a game controller board of the present invention; and FIG. 2 is an elevation of the game controller board.

Corresponding reference characters indicate corresponding parts throughout the several views of the drawings.

DETAILED DESCRIPTION OF THE PREFERRED EMBODIMENT

Referring now to the drawings, there is generally indicated at 1 a game controller board holder of the present invention capable of releasably holding a game controller board 3. The game controller board is of the type having a housing 5 and a cord 7 extending from the housing adapted to electrically connect the board 3 to a game monitor (not shown). In many instances, the monitor is a standard television set to which the video arcade game is connected. Another cord (not shown) may be provided for electrical connection of the game controller board 3 to an electrical outlet.

As shown in the drawings, holder 1 comprises a generally planar platform 13 having a first or top surface 15 which supports game controller board 3, and a second or bottom surface 17, opposite surface 15. A cord holder, generally indicated at 19, depends from the second surface 17 and is adapted to receive coils of cord 7 around it. In a preferred embodiment, cord holder 19 is a column extending generally perpendicularly down from an interior region of the second surface 17 of platform 13. A generally planar base member 21 is made to rest on a generally horizontal, planar surface, such as a table or counter top and supports the cord holder and platform above it. Cord holder 19 has a first end 23 fixed to the base member 21 and a second end 25 fixed to the second surface 17 of platform 13. As shown in FIG. 2, platform 13, cord holder 19 and base member 21 may be integrally formed as one piece from the same material such as plastic.

Platform 13 is of generally rectangular shape which conforms generally to the shape of the game controller board 3. The platform 13 has a first long edge 27 constituting a front edge and a second long edge 29 constituting a back edge. Likewise, the game controller board has a first long edge 31 constituting a front edge and a second long edge 33 constituting a back edge. The platform 13 may be shaped other than as illustrated, so long as it conforms generally to the shape of the game controller board. Generally, base member 21 is of corresponding shape and size as platform 13, but is not required to be such.

Two spaced apart, snap-acting retainers (broadly "securing means") which releasably secure the board 3 to platform 13 are generally indicated at 41. Retainers 41 project from the top surface 15 of platform 13 and may engage the controller board 3. More particularly, connectors 41 are two generally opposed resilient walls 43 and 45 which extend along the longitudinal edges 27, 29 of the platform's top surface 15. The walls 43, 45 have detents 47, 49 projecting inwardly from an upper portion of the walls. Each detent operates to engage the top surface of the game controller board 3 to retain the board on the platform. The detents 47, 49 have a generally upwardly facing ramped surface sloping generally downwardly in a plane intersecting the plane of the associated wall at an acute angle.

As shown in FIG. 2, the innermost ends of each inwardly projecting detent 47, 49 are spaced apart a distance d1 and the walls 43, 45 are spaced apart a greater distance d2. A game controller board housing 5 is of a greater width than d1, but of a slightly lesser width than d2. To install the housing 5 on the platform 13, the housing is moved from a position generally above the top surface 15 and walls 43, 45 of the platform downwardly toward the top surface. The lower portions of the housing first engage the ramped surfaces of the detents 47, 49 so that the detents and walls 43, 45 are wedged outwardly to a flexed position. After the upper surface of the housing 5 clears the detents 47, 49, the walls 43, 45 and detents snap back substantially to their relaxed position with generally horizontal surfaces of the detents disposed over or engaging the upper surface of the housing to retain the housing on the platform 13. However, the walls 43, 45 preferably remain slightly flexed for applying a gripping force against the housing 5 to hold it from sliding on the platform 13. Releasing the housing 5 from the retainers 41 is accomplished by pulling the walls 43, 45 apart and lifting the housing upwardly from between the walls.

Generally indicated at 61 is a clip for releasably fastening a portion of the cord 7 to a the holder 1. As shown in the drawings, clip 61 is mounted on the back side of wall 45. Locating the clip 61 on the wall 45 is believed to be convenient for storing cord 7, however, it is to be understood that the clip may be positioned at other locations on the holder 1 and still fall within the scope of the invention. The clip 61 comprises two generally opposed, resilient, snap-acting receiving members 63, 65 which receive a portion of the cord 7. After cord 7 is wrapped around cord holder 19, the end of the cord may be releasably secured in clip 61 to hold the cord from unwinding.

In view of the above, it will be seen that the several objects of the invention are achieved and other advantageous results attained.

As various changes could be made in the above constructions without departing from the scope of the invention, it is intended that all matter contained in the above description as shown in the accompanying drawing shall be interpreted as illustrative and not in a limiting sense.

What is claimed is:

1. A game controller board holder for a game controller board having a housing and a cord extending from the housing, the holder comprising:
    a generally planar platform for supporting the game controller board housing placed on the platform, the platform having first and second surfaces on opposite sides of the platform, the first surface adapted to engage the game controller board housing;
    means for releasably securing the housing to the platform;
    means for holding the cord generally adjacent the platform, said cord holding means comprising a column extending from the platform, the column depending from an interior region of the second surface and being generally perpendicular to the second surface and adapted to receive and hold coils of the cord wrapped therearound;
    said means for releasably securing the board to the platform comprising two spaced apart resilient walls extending from the platform, the walls are adapted to engage and hold the controller board housing and extend generally along longitudinal edges of the platform and project upwardly from the platform, each wall having extending from the top end therefrom a generally inwardly projecting detent, each detent being adapted to retain the controller board housing on the platform, the detents each include a ramped surface sloping downwardly generally in planes intersecting the planes of the corresponding walls at an acute angle, the detents being spaced apart a lesser distance than the width of the game controller board housing, such that as the housing is moved generally downwardly toward the first surface of the platform, lower portions of the housing engage the ramped surfaces of the detents pushing the detents and resilient walls apart to a flexed position, thereafter the housing clearing the detents and the walls snapping back substantially to their relaxed position with the detents disposed over an upper surface of the housing for retaining the housing on the platform.

2. A game controller board holder for a game controller board having a housing and a cord extending from the housing, the holder comprising a generally planar platform for supporting the game controller board housing placed on the platform, the platform having first and second surfaces on opposite sides of the platform, the first surface adapted to engage the game controller board housing, means for releasably securing the housing to the platform, means for holding the cord generally adjacent the platform, said cord holding means comprises a column extending from the platform, the column depends from an interior region of the second surface and is generally perpendicular to the second surface and is adapted to receive and hold coils of the cord wrapped therearound, and means for releasably fastening a portion of the cord.

3. A holder as set forth in claim 2 wherein said means for releasably fastening a portion of the cord comprises a clip adapted to hold a portion of the cord.

4. A holder as set forth in claim 3 wherein the clip comprises two generally opposed resilient receiving members adapted to receive and hold a portion of the cord therebetween.

5. A game controller board holder for a game controller board having a housing and a cord extending from the housing, the holder comprising a platform having first and second opposing surfaces, the platform being adapted to support the game controller board housing, means for releasably securing the housing to the platform comprising two generally opposing resilient snap-acting walls extending along opposite edges of the platform and projecting upwardly from the platform, and a detent projecting generally inwardly from an upper portion of each wall, whereby to install the housing on the platform, the housing is moved toward the first surface of the platform and lower portions of the housing engage the detents such that the opposing detents and walls are pushed apart to a flexed position and the housing is received between the walls, thereafter the housing clearing the detents and the walls snapping back substantially to their relaxed position with the detents disposed over an upper surface of the housing for retaining the housing on the platform.

6. A holder as set forth in claim 5 wherein the detents each include a ramped surface sloping downwardly generally in planes intersecting the planes of the corresponding walls at an acute angle.

7. A holder as set forth in claim 5 further comprising means for holding the cord generally adjacent the platform.

8. A holder as set forth in claim 7 wherein said cord holding means comprises a column extending from the platform, the column being adapted to receive and hold coils of the cord wrapped therearound.

9. A holder as set forth in claim 8 wherein the column depends from the second surface of the platform.

10. A holder as set forth in claim 9 wherein the platform is generally planar, the first and second surfaces being on opposite sides of the platform, the column depending from an interior region of the second surface and being generally perpendicular to the second surface.

11. A holder as set forth in claim 10 further comprising a generally planar base member located at the end of the column opposite the platform, the base member being adapted to rest on a generally horizontal surface.

12. A holder as set forth in claim 5 further comprising means for releasably fastening a portion of the cord to the holder, said fastening means comprising a clip including two generally opposed resilient receiving members adapted to receive and hold a portion of the cord therebetween.

13. A holder as set forth in claim 5 wherein the detents are spaced apart a lesser distance than the width of the game controller board housing, such that as the housing is moved generally downwardly toward the first surface of the platform, lower portions of the housing engage the ramped surfaces of the detents pushing the detents and resilient walls apart to the flexed position, thereafter the housing clearing the detents and the walls snapping back substantially to their relaxed position with the detents disposed over an upper surface of the housing for retaining the housing on the platform.

* * * * *